US007608323B2

(12) United States Patent
Clemens et al.

(10) Patent No.: US 7,608,323 B2
(45) Date of Patent: Oct. 27, 2009

(54) PROTECTIVE ARTICLES

(75) Inventors: Timothy J. Clemens, Hastings, MN (US); Charles D. Hoyle, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 417 days.

(21) Appl. No.: 11/553,676

(22) Filed: Oct. 27, 2006

(65) Prior Publication Data

US 2007/0047099 A1 Mar. 1, 2007

Related U.S. Application Data

(60) Division of application No. 10/083,092, filed on Feb. 26, 2002, now Pat. No. 7,141,303, which is a continuation-in-part of application No. 09/799,753, filed on Mar. 6, 2001, now abandoned.

(51) Int. Cl.
*B32B 27/12* (2006.01)
*B32B 27/04* (2006.01)
*B32B 27/08* (2006.01)
*B32B 27/28* (2006.01)
*B32B 27/38* (2006.01)

(52) U.S. Cl. .................. 428/300.7; 428/297.4; 428/343; 428/421

(58) Field of Classification Search .............. None
See application file for complete search history.

(56) References Cited

U.S. PATENT DOCUMENTS

| | | | |
|---|---|---|---|
| 2,946,710 A | 7/1960 | Fields | |
| 3,018,262 A | 1/1962 | Schroeder | |
| 3,117,099 A | 1/1964 | Proops et al. | |
| 3,989,873 A | 11/1976 | Robertson et al. | |
| 4,098,756 A | 7/1978 | Miller et al. | |
| 4,323,603 A * | 4/1982 | Close | 524/545 |
| 4,503,211 A | 3/1985 | Robins | |
| 4,507,456 A | 3/1985 | Blum et al. | |
| 4,594,761 A * | 6/1986 | Murphy et al. | 29/889.71 |
| 4,670,089 A | 6/1987 | Hanson | |
| 4,684,678 A | 8/1987 | Schultz et al. | |
| 4,707,534 A | 11/1987 | Schultz | |
| 4,777,084 A | 10/1988 | Marteness | |
| 4,916,020 A | 4/1990 | Golding et al. | |
| 4,986,496 A | 1/1991 | Marentic et al. | |
| 5,043,393 A | 8/1991 | Honma et al. | |
| 5,106,673 A | 4/1992 | Effenberger et al. | |
| 5,132,164 A | 7/1992 | Moriya et al. | |
| 5,133,516 A | 7/1992 | Marentic et al. | |
| 5,139,878 A | 8/1992 | Kim et al. | |
| 5,177,126 A | 1/1993 | Moore et al. | |
| 5,179,181 A | 1/1993 | Honma et al. | |
| 5,238,748 A | 8/1993 | Effenberger et al. | |
| 5,276,106 A | 1/1994 | Portelli et al. | |
| 5,337,129 A | 8/1994 | Badesha | |
| 5,369,192 A | 11/1994 | Ko et al. | |
| 5,442,035 A | 8/1995 | Corley et al. | |
| 5,470,622 A | 11/1995 | Rinde et al. | |
| 5,485,541 A | 1/1996 | Bigley, Jr. et al. | |
| 5,576,818 A | 11/1996 | Badesha et al. | |
| 5,656,121 A | 8/1997 | Fukushi | |
| 5,658,670 A | 8/1997 | Fukushi et al. | |
| 5,660,667 A | 8/1997 | Davis | |
| 5,670,557 A | 9/1997 | Dietz et al. | |
| 5,728,755 A | 3/1998 | Weigel et al. | |
| 5,733,981 A | 3/1998 | Coggio et al. | |
| 5,736,249 A | 4/1998 | Smith et al. | |
| 5,755,913 A | 5/1998 | Liaw et al. | |
| 5,848,769 A | 12/1998 | Fronek et al. | |
| 5,855,977 A | 1/1999 | Fukushi et al. | |
| 5,889,125 A | 3/1999 | Neumann et al. | |
| 5,922,425 A | 7/1999 | Greuel | |
| 5,972,176 A | 10/1999 | Kirk et al. | |
| 6,054,221 A | 4/2000 | Weigel et al. | |
| 6,120,849 A | 9/2000 | Smith et al. | |
| 6,156,400 A | 12/2000 | Jing et al. | |
| 6,177,189 B1 | 1/2001 | Rawlings et al. | |
| 6,372,870 B1 | 4/2002 | Kitahara et al. | |
| 2002/0117259 A1 | 8/2002 | Giroux et al. | |

FOREIGN PATENT DOCUMENTS

| | | | |
|---|---|---|---|
| EP | 0 278 685 A2 | 8/1988 | |
| EP | 0 646 625 A2 | 4/1995 | |

(Continued)

OTHER PUBLICATIONS

"Paintless Aircraft Technology", Aero. Eng'g, Nov. 1997, p. 17.
"Replacing Paint With Tape Films", Aero. Eng'g, Mar. 1998, pp. 39, 40.
*Polymer Interface and Adhesion*, Souheng Wu, Ed., Marcel Dekker, Inc., NY and Basel, pp. 279-336 (1982).
*Encyclopedia of Polymer Science and Engineering*, Second Edition, Supplemental Volume, John Wiley & Sons, pp. 674-689 (1989).
Brochure: 3M Adhesive Technology, Designer Reference Guide, 3M™ Scotch-Weld™ Structural Adhesives, 3M IPC 2000, 78-6900-2848-1.
Brochure: ASTM Designation: D 2794-93, Standard Test Method for Resistance of Organic Coatings to the Effects of Rapid Deformation (Impact)[1], Nov. 1993, pp. 307-308.
Abstract, JP 05 245032 (Sep. 1993).

*Primary Examiner*—Michael J Feely
(74) *Attorney, Agent, or Firm*—Philip Y. Dahl; Scott Bartell

(57) ABSTRACT

The invention provides protective articles comprising a backing that comprises a fluorinated polymer and a curable adhesive on at least one layer of the backing. The protective articles of the invention may be used to provide substrates or articles of the invention having a fluorinated surface. The invention also provides methods of preparing such articles, methods of repairing appliqués, and methods of edge sealing appliqués.

7 Claims, No Drawings

FOREIGN PATENT DOCUMENTS

| | | |
|---|---|---|
| FR | 2 201 184 | 4/1974 |
| GB | 1 522 341 | 8/1978 |
| WO | WO 90/09853 | 9/1990 |
| WO | WO 93/03922 | 3/1993 |
| WO | WO 94/19114 | 9/1994 |
| WO | WO 95/11466 | 4/1995 |
| WO | WO 97/39890 | 10/1997 |
| WO | WO 97/44401 | 11/1997 |
| WO | WO 98/28377 | 7/1998 |
| WO | WO 99/00249 | 1/1999 |
| WO | WO 99/00454 | 1/1999 |
| WO | WO 99/00455 | 1/1999 |
| WO | WO 99/00460 | 1/1999 |
| WO | WO 99/32557 A1 * | 7/1999 |
| WO | WO 99/47613 | 9/1999 |
| WO | WO 99/64235 | 12/1999 |
| WO | WO 99/65674 | 12/1999 |
| WO | WO 00/06376 | 2/2000 |
| WO | WO 00/13891 | 3/2000 |
| WO | WO 00/69969 | 11/2000 |
| WO | WO 01/96487 A2 | 12/2001 |

* cited by examiner

PROTECTIVE ARTICLES

CROSS-REFERENCE TO RELATED APPLICATIONS

This application is a divisional of U.S. application Ser. No. 10/083,092, filed Feb. 26, 2002 now U.S. Pat. No. 7,141,303; which is a continuation-in-part of U.S. application Ser. No. 09/799,753, filed Mar. 6, 2001, now abandoned.

FIELD OF THE INVENTION

The present invention relates to fluoropolymer films having an adhesive on at least one surface of the fluoropolymer film.

BACKGROUND OF THE INVENTION

Painting has long been the process of choice for applying coatings to surfaces especially those having complex curvature. Painting is generally a controllable, reliable, and versatile process. The paint can include additives to give the surface desired physical properties, such as gloss, color, reflectivity, or combinations thereof. The painting process is well understood and produces quality coatings having uniform properties even when the surface includes complex curvature. Unfortunately, painting is falling under closer environmental scrutiny because it uses volatile solvents to carry the pigments or because of the pigments themselves. Therefore, there is a need to replace the painting process with a process that has less environmental impact. Furthermore, while painting is well defined, well understood, and common, it remains an "art" where masters produce better products than novices or apprentices without necessarily being able to account for why or to teach others how.

Painted surfaces sometimes lack the durability that quality-conscious customers demand. The surface must be treated and cleaned prior to applying the paint. The environment surrounding the part must be controlled to capture volatile organic compounds (VOCS) during the coating application, often requiring a spray booth. Painted coatings are also vulnerable to damage like cracks or scratches. Isolated damage may require the repair of a large area, such as forcing the repainting of an entire panel.

Spraying inherently wastes paint and is unpredictable because of the "art" involved with the application. Improper application cannot be detected until the spraying is complete, then rework to correct a defect usually affects a large area even for a small glitch. Spraying large objects like aircraft requires special equipment and special capital facilities, for example, paint spray booths, in which the environment and flow conditions are controlled.

U.S. Pat. No. 4,986,496 (Marentic et al.) describes a drag reduction article in the form of a conformable sheet material (a decal) with surface texturing for application to aircraft flow control surfaces to reduce aircraft drag. The material fits on curved surfaces without cracks, bubbles, or wrinkles because of the paint-like properties of the basic carrier film. Marentic et al.'s decals are manufactured flat and are stretched to the intended simple curvature. Stretching can be problematic over time if the stretched material shrinks to expose a gap between adjacent decals where weather can attack the decal-surface interface. Stretching generally limits Marentic appliqués to surfaces of slowly changing curvature.

Appliqués (that is, decals) are also described in U.S. Pat. No. 5,660,667 (Davis). The appliqués having complex curvature form complete, bubble-free, wrinkleless coverings on surfaces of complex curvature without significant stretching. Davis applies these appliqués by:

(a) analyzing and mapping the Gaussian curvature of the surface to be covered to identify lines of constant Gaussian curvature;

(b) identifying geodesic lines on the surface, such that the lines of constant Gaussian curvature and the geodesics form a mapping grid on the surface;

(c) analyzing the sketchiness needed to blend between appliqués of adjacent areas of different Gaussian curvature;

(d) producing appliqués for each Gaussian curvature using a family of molds;

(e) identifying on the surface the grid made up of the lines of constant Gaussian curvature and intersecting geodesics; and (f) applying appliqués of a particular Gaussian curvature along the matching line of constant Gaussian curvature on the surface to produce a complete, bubble-free, wrinkleless covering on the surface comparable to a conventional painted coating and while minimizing stretching of any appliquée to complete the coating.

Identifying the grid can include physically marking the lines, displaying them with an optical template, or simply defining them in a three-dimensional digital data model for the surface.

The Davis method recognizes that surfaces having the same Gaussian curvature can be mapped topologically. If you have a surface of Gaussian curvature 5 ft$^{-2}$, for example, instead of making a "splash" mold of the surface to make appliqués, you mold appliqués to curvature 5 ft$^{-2}$ on a master curvature 5 ft$^{-2}$ mold, which, for example, might be a sphere. Appliqués from the master mold will fit bubble-free and wrinkleless on the actual surface.

Often surfaces must be protected against corrosion. Such protection commonly involves surface treatments or primers (that is, chromated primers or conversion coatings) that are relatively expensive because of the chemicals involved and the time associated with their application. These traditional coatings are relatively heavy, especially when coupled with other surface coatings that must be applied over the corrosion protection coating to provide color, gloss, enhanced surface durability, abrasion protection, a combination of these attributes, or other attributes. The chemicals used in conventional corrosion protection coatings often are hazardous materials.

Appliqués are of considerable interest today for commercial and military aerospace applications. Lockheed Martin and Minnesota Mining and Manufacturing Company have conducted flight tests on paintless aircraft technologies. These appliqués promise to save production costs, support requirements, and aircraft weight while providing significant environmental advantages. The appliqués are described in greater detail in the article: "PAINTLESS AIRCRAFT TECHNOLOGY", AERO. ENG'G, Nov. 1997, p. 17. Commercial airlines, like Western Pacific, use appliqués to convert their transports into flying billboards. Durable appliqués that can replace conventional military or commercial aviation paint systems are sought to reduce lifecycle costs, improve performance, and protect the underlying surfaces from corrosion.

The increasing interest in appliqués is described in the article: "REPLACING PAINT WITH TAPE FILMS", AERO. ENG'G, Mar., 1998, pp. 39, 40. All the major military and commercial aircraft manufacturers are pursuing research and development programs to perfect appliqués. One important issue unresolved for appliqués is edge sealing. The seams between adjacent appliqués in some instances need to be treated for aerodynamic reasons.

A surface can be covered with appliqués to provide a vapor barrier and corrosion protection. The corrosion protection achievable with appliqués may be adequate to eliminate altogether the need for conventional surface corrosion protection treatments, thereby, saving weight and reducing environmental concerns. Alternatively, the combination of appliqués with environmentally friendly but relatively inferior, chromate-free conversion coatings may replace the environmentally sensitive, traditional corrosion protection techniques (that is, chromated conversion coatings and primers).

Corrosion on metal surfaces or around metal fasteners in resin composite structures produces oxidation that reduces the surface quality and that frequently can make the structural integrity suspect. Maintenance to correct corrosion or to ensure that it does not occur is costly because it is labor-intensive. A more reliable corrosion protection system would find widespread acceptance in commercial and military aerospace.

In addition to the corrosion protection that appliqués described above can provide, the vapor barrier can be beneficial independently on aerospace structure to limit the migration of water through a structure. For example, with composite honeycomb sandwich structure, a vapor barrier appliqué can slow or eliminate the migration of water through the laminated face sheets into the honeycomb core.

When making precision coatings that are important for aerodynamic drag and other considerations on modern commercial and military aircraft, spray painting is a relatively unreliable process because it is difficult to control the spray head and spraying conditions to obtain precisely the same coating from article to article. One variable in this spray process that often is overlooked is the natural variation from article to article in the vehicle to which the paint is applied. Such variation results from the accumulation of tolerances (that is, the accumulated variation that results from variations within allowable control limits for each pan in the assembly). Appliqués allow better control of the manufacture of the coating so that it will have the correct spectral properties by distributing pigments, additives, and thin films properly throughout the appliqué and, thereby, over the surface. The benefits of appliqués are further enhanced if the appliqués simultaneously provide corrosion protection. Difficulties in precisely manufacturing painted coatings to obtain the desired properties can be overcome without the cost of either scrapping an entire article because the coating is imperfect and inadequate or forcing costly stripping and reapplication of the coating.

Using appliqués allows small area repair of the precision coatings on aerospace surfaces by simply cutting away the damaged area and reinserting a suitable, fresh appliqué patch. With paint, the spray transition between the stripped area and the original coating in such a repair is troublesome. For example, an entire panel usually needs to be re-coated with paint to fix a small area defect. Operations like paint spraying, surface preparation, masking or otherwise isolating the repair area, and the like, slow the repainting process.

SUMMARY OF THE INVENTION

In one aspect, the invention provides protective articles which comprise a backing that comprises a fluoropolymer (also called a fluorinated polymer) and a curable adhesive layer on at least one surface of the backing. The curable adhesive layer is thermosetting and is non-tacky to the touch after curing.

In another aspect, the invention provides composite articles having a fluoropolymer film surface. The composite articles comprise a protective article or a fluoropolymer film in contact with an uncured composite article.

In another aspect, the invention provides a composite article comprising a protective article of the invention in contact with a cured composite article.

In another aspect, the invention provides a method of making an article having a fluoropolymer surface comprising the step of contacting a protective article of the invention with a surface of the article and curing the curable adhesive.

In another aspect, the invention provides a method of providing an article having a fluoropolymer surface comprising the steps of contacting a surface of the article with a curable adhesive, contacting a fluoropolymer film with the curable adhesive, and curing the curable adhesive.

In another aspect, the invention provides a method of sealing an edge of an appliqué positioned on a substrate comprising the steps of placing a protective article of the invention along the edge of the appliqué such that the protective article overlaps the appliqué and the substrate, and curing the curable adhesive of the protective article.

In another aspect, the invention provides a method of sealing adjacent polymeric film appliqués comprising the steps of defining a seam by abutting edges of two polymeric appliqués together on a substrate, applying a protective article of the invention along the seam over the abutted edges of the polymeric appliqués, and curing the curable adhesive of the protective article.

In yet another aspect, the invention provides a method of repairing a damaged area of protected surface comprising the steps of placing a protective article of the invention onto and covering the damaged area of the protected surface, and curing the curable adhesive layer.

The protective articles of the invention have many different uses including use as: edge sealers for fluoropolymer appliqués; appliqués; repair articles for an appliqué; and other protective articles, and to make prepregs and composite articles having a fluoropolymer surface. The protective articles of the invention can be used to seal the edges of, or repair, surfaces such as painted surfaces and fluoropolymer appliqués that are adhered to a substrate with virtually any type of adhesive, for example, pressure sensitive adhesives, thermosetting adhesives, hot melt adhesives, and the like. Additionally, the constructions of the fluoropolymer appliqués that can be repaired or edge-sealed are not limited and include such constructions as described in PCT Publication WO 99/64235.

One of the aspects of the protective articles of the invention is their ability to bond to a substrate and have an exposed edge and provide improved solvent resistance. A surprising aspect of the protective articles of the invention is their ability to form a solvent resistant bond to fluoropolymer that is also tenacious. Another surprising aspect of the protective articles of the invention is that the solvent resistance and bond strength to fluoropolymers can be achieved using relatively thin layers of a curable adhesive on the fluorinated polymer (also called fluoropolymer backing).

DETAILED DESCRIPTION OF THE PREFERRED EMBODIMENTS

The present invention is directed to protective articles, particularly protective articles for replacing paint on substrates, or sealing the edges of, or repairing, existing appliqués where color and finish matching is desired. Such protective articles are useful on vehicles, such as planes, trains, and automobiles, boats, and ships. They can be used on painted, primed (for example, epoxy primer, chromated primer), or bare surfaces. They can be used on metal surfaces, particularly aluminum surfaces, which can be an anodized surface, a chromate-treated surface (which results from treatment with Alodine 1200, available from Amchem Products, Inc., Abmoler, Pa.), or otherwise treated surface. They can be used on surfaces of composite materials, such as carbon fiber reinforced plastics, for example.

The protective articles of the present invention can be in a variety of shapes, sizes, and thicknesses. They can be in the form of sheet materials or they can be bonded to three-dimensional shaped articles, such as a thermal-formed boot. Such three-dimensional shaped protected articles can be used on the wingtip or nose of an airplane, for example. If in the form of a sheet material, the protective article typically has a thickness of about 12-760 micrometers, whereas if it is bonded to a three-dimensional object, the protective article typically has a thickness of about 170-760 micrometers.

The protective articles of the present invention can be used as decals and decorative protective articles or, where they are applied, can be used as protective articles to reduce corrosion, gouge, and scratch damage, for example. They can be used in multiple layers, such as a protective article over a decal or a decal over a protective article, for example. Significantly, the protective articles of the present invention can be used to completely cover the exterior surface of a vehicle, such as an airplane, as a replacement for paint or other finish, as a protective coating over paint, or as a coating under paint. They can be applied such that the edges of the protective articles overlap or form butt joints.

Backing

Backings of the protective articles of the present invention include one or more fluorinated polymers. Herein, a polymer includes homopolymers and copolymers. Copolymers include polymers containing two or more different monomers, including terpolymers, tetrapolymers, etc. Preferably, the fluorinated polymers are prepared from olefinically unsaturated monomers. Also, preferably, the fluorinated polymers are not perfluorinated. That is, although they may be made from perfluorinated monomers, the resultant polymers have both C—H and C—F bonds, for example. Additionally, the fluorinated polymer used in the backing is not required to be functionalized.

Preferably, fluorinated polymers suitable for use in making backings for protective articles of the present invention are those that form conformable, fluid-resistant sheet materials. As used herein, a "conformable" backing is one that can be applied to various contoured and/or complex surfaces and maintains intimate contact with the entire surface for the time required for the desired application. Preferably, a conformable backing passes the conformability test described in PCT Publication WO 99/64235. A fluid-resistant backing is one that does not demonstrate a change in weight by more than about 10 percent after being immersed in a hydrocarbon fluid (for example, jet fuel) or a phosphate ester hydraulic fluid (for example, SKYDROL hydraulic fluid) for 14 and 30 days, respectively, at room temperature.

One class of useful fluorinated polymers include interpolymerized units derived from vinylidene fluoride (also referred to as "$VF_2$" or "VDF"). Such materials typically include at least about 3 weight percent of interpolymerized units derived from $VF_2$, which may be homopolymers or copolymers with other ethylenically unsaturated monomers, such as hexafluoropropylene ("HFP"), tetrafluoroethylene ("TFE"), chlorotrifluoroethylene ("CTFE"), 2-chloropentafluoropropene, perfluoroalkyl vinylethers, perfluorodialIylether, perfluoro-1,3-butadiene, and the like. Such fluorine-containing monomers may also be copolymerized with fluorine-free terminally unsaturated olefinic comonomers, such as ethylene or propylene. Preferred such fluoropolymers include tetrafluoroethylene-hexafluoropropylene-vinylidene fluoride terpolymers and hexafluoropropylene-vinylidene fluoride copolymers. Commercially available fluoropolymer materials of this type include, for example, THV 200, THV 400, and THV 500 fluoropolymers, which are available from Dyneon LLC of Oakdale, Minn., and SOLEF 11010, which is available from Solvay Polymers Inc., Houston, Tex.

Another class of useful fluorinated polymers include interpolymerized units derived from one or more of hexafluoropropylene ("HFP"), tetrafluoroethylene ("TFE"), chlorotrifluoroethylene ("CTFE"), and/or other perhalogenated monomers and further derived from one or more hydrogen-containing and/or non-fluorinated olefinically unsaturated monomers. Useful olefinically unsaturated monomers include alkylene monomers, such as ethylene, propylene, 1-hydropentafluoropropene, 2-hydropentafluoropropene, etc. A preferred such fluoropolymer is a copolymer of poly (tetrafluoroethylene) and ethylene. Commercially available fluoropolymer materials of this type include, for example, TEFZEL LZ300 fluoropolymers, which are available from DuPont Films, Buffalo, N.Y.

Other useful fluorinated polymers, preferably nonperfluorinated polymers, include poly(vinylfluoride), such as TEDLAR TAW15AH8, which is available from DuPont Films of Buffalo, N.Y. Blends of fluoropolymers can also be used to make the backings for the protective articles of the present invention. For example, blends of two different types of nonperfluorinated fluoropolymers can be used, as well as blends of a nonperfluorinated fluoropolymer with a perfluorinated fluoropolymer. Furthermore, blends of fluoropolymers with nonfluoropolymers, such as polyurethane and polyethylene, for example, can also be used, as long as one of the polymers in the blend is a fluoropolymer, and the nonfluoropolymer is used in a minor amount. Fluorinated polymer backings for use in the present invention can be made using a variety of methods, including cast and extrusion methods, preferably, however, they are extruded.

The backings may be clear and colorless, or preferably include a colorant, such as a pigment or dye. Preferably, the colorant is an inorganic pigment, such as those disclosed in U.S. Pat. No. 5,132,164. The pigment may be incorporated into one or more non-fluorinated polymers, which can be blended with one or more fluorinated polymers. The backings may be finish and/or color-matched to existing appliqué or paint color schemes, for example, Federal Standard 595B, Color No. 36375.

The backings are typically in the form of sheet materials having two major surfaces. Optionally, at least one of the surfaces may be treated to allow for bonding of the adhesive. Such treatment methods include corona treatment, particularly corona discharge in an atmosphere containing nitrogen, and about 0.1 to about 10 volume percent of an additive gas selected from the group consisting of hydrogen, ammonia, and mixtures thereof, as disclosed in U.S. Pat. No. 5,972,176 (Kirk et al.). Another useful treatment method includes a chemical etch using sodium naphthalenide. Such treatment methods are disclosed in *Polymer Interface and Adhesion*, Souheng Wu, Ed., Marcel Dekker, Inc., NY and Basel, pp. 279-336 (1982), and *Encyclopedia of Polymer Science and*

Engineering, Second Edition, Supplemental Volume, John Wiley & Sons, pp. 674-689 (1989). Another useful treatment method is the FLUOROETCH process, available from Acton Industries, Inc., Pittston, Pa. Other treatment methods include the use of such materials as primers. These may be employed either in place of, or in addition to the surface treatments described above. An example of a useful primer is ADHESION PROMOTER #86A (a liquid primer, available from Minnesota Mining and Manufacturing Company, St. Paul, Minn.).

Curable Adhesive Layer

The protective articles of the invention comprise a backing and a thermally or moisture curable adhesive on at least one surface of the backing, that is, a curable adhesive layer. Examples of such curable adhesives include epoxy resins (epoxide resin+curing agent), acrylates, cyano-acrylates, and urethanes. The curable adhesives used in the protective articles of the invention are non-tacky to the touch after curing and are thermosetting, that is cure through the action of heat, catalysts, UV light, and the like.

Epoxide Resins

Epoxide resins useful in the protective articles of the invention are any organic compounds having at least one oxirane ring, that is,

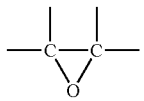

polymerizable by a ring opening reaction. Such materials, broadly called epoxides, include both monomeric and polymeric epoxides and can be aliphatic, heterocyclic, cycloaliphatic, or aromatic and can be combinations thereof. They can be liquid or solid or blends thereof, blends being useful in providing tacky adhesive films prior to cure. These materials generally have, on the average, at least two epoxy groups per molecule and are also called "polyepoxides." The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more.

Useful epoxide resins include those which contain cyclohexene oxide groups such as the epoxycyclohexane carboxylates, typified by 3,4-epoxycyclohexylmethyl-3,4-epoxycyclohexane carboxylate, 3,4-epoxy-2-methylcyclohexylmethyl-3,4-epoxy-2-methycyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxide resins which are particularly useful in the practice of this invention include glycidyl ether monomers of the formula:

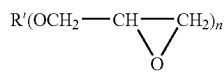

where R' is aliphatic, for example, alkyl; aromatic, for example, aryl; or combinations thereof, and n is an integer of 1 to 6. Examples are the glycidyl ethers of polyhydric phenols such as the diglycidyl ether of 2,2-bis-(4-hydroxyphenol) propane (Bisphenol A) and copolymers of (chloromethyl) oxirane and 4,4'-(1-methylethylidene)bisphenol. Further examples of epoxides of this type which can be used in the practice of this invention are described in U.S. Pat. No. 3,018,262, incorporated herein by reference.

There are a host of commercially available epoxide resins that can be used in this invention. In particular, epoxides which are readily available include styrene oxide, vinylcyclohexene oxide, glycidol, glycidyl methacrylate, diglycidyl ether of Bisphenol A (for example, those available under the trade designations "EPON 828", "EPON 1004", and "EPON 1001F" from Shell Chemical Company, and "DER-332" and "DER-334", from Dow Chemical Company), diglycidyl ether of Bisphenol F (for example, those under the trade designations "ARALDITE GY281" from Ciba-Geigy Corporation, and "EPON 862" from Shell Chemical Company), vinylcyclohexane dioxide (for example, having the trade designation "ERL-4206" from Union Carbide Corporation), 3,4-epoxycyclohexyl-methyl-3,4-epoxycyclohexene carboxylate (for example, having the trade designation "ERL-422 1" from Union Carbide Corporation), 2-(3,4-epoxycyclohexyl-5,5 -spiro-3,4-epoxy)cyclohexane-metadioxane (for example, having the trade designation "ERL-4234" from Union Carbide Corporation), bis(3,4-epoxycyclohexyl) adipate (for example, having the trade designation "ERL-4299" from Union Carbide Corporation), dipentene dioxide (for example, having the trade designation "ERL-4269" from Union Carbide Corporation), epoxidized polybutadiene (for example, having the trade designation "OXIRON 2001" from FMC Corporation), flame retardant epoxide resins (for example, having the trade designation "DER-542", a brominated bisphenol type epoxy resin available from Dow Chemical Company), 1,4-butanediol diglycidyl ether (for example, having the trade designation "ARALDITE RD-2" from Ciba-Geigy Corporation), diglycidyl ether of hydrogenated Bisphenol A based epoxide resins (for example, having the trade designation "EPONEX 1510" from Shell Chemical Company), and polyglycidyl ether of phenol-formaldehyde novolak (for example, having the trade designations "DEN-43 1" and "DEN-438" from Dow Chemical Company)

Epoxide Resin Curing Agent

The term "curing agent" is used broadly to include not only those materials that are conventionally regarded as curing agents but also those materials that catalyze epoxy polymerization as well as those materials that may act as both curing agent and catalyst. Preferred curing agents for the epoxide resin include, for example, room temperature curing agents, heat-activated curing agents, and combinations thereof, and photolytically activated curing agents. Room temperature curing agents and heat-activated curing agents can include, for example, blends of epoxy homopolymerization type curing agents and addition type curing agents. The curing agents preferably react at temperatures of between about room temperature and about 200° C., more preferably about room temperature and 150° C., even more preferably between about room temperature and about 115° C. If the curing agents are used in epoxy resins that are used to make prepregs to make composite articles, then the curring agents preferably react at temperatures in the range of about 200° F. (93° C.) to about 350° F. (177° C.), more preferably about 200° F. (93° C.) to about 250° F. (121° C.).

Examples of suitable curing agents include polybasic acids and their anhydrides, for example, di-, tri- and higher carboxylic acids such as oxalic acid, phthalic acid, terephthalic acid, succinic acid, maleic acid, alkyl and alkenyl substituted succinic acids, tartaric acid, and anhydrides, for example, phthalic anhydride, succinic anhydride, maleic anhydride, nadic anhydride and pyromellitic anhydride; polymerizable unsaturated acids, for example, those containing at least 10 carbon atoms, for example, dodecendioic acid, 10,12-eicosadiendioic acid; and mercaptans.

Examples of other suitable curing agents include nitrogen containing compounds, for example, benzyldimethylamine, benzylamine, N,N-diethyl aniline, melamine, pyridine, hydrazides, and aromatic polyamines, such as o-, m-, and p-phenylene diamine, 4,4'-diaminodiphenyl sulfone, 3,3'-diaminodiphenyl sulfone, and 4,4'-diaminodiphenyl sulfide, 4,4'-diaminodiphenyl ketone, 4,4'-diaminodiphenyl ether, 4,4'-diaminodiphenyl methane, 1,3-propanediol-bis(4-aminobenzoate), fluorene-containing amines (for example, 9,9-bis(4-aminophenyl)fluorene, 9,9-bis(3-methyl-4-aminophenyl)fluorene, 9,9-bis(3,5-dimethyl-4-methylaminophenyl)fluorene, 9,9-bis(3,5-dimethyl-4-aminophenyl)fluorene, 9,9-bis(3,5-diisopropyl-4-aminophenyl)fluorene, and 9,9-bis(3-chloro-4-aminophenyl)fluorene); 1,4-bis[α-(4-aminophenyl)-α-methylethyl]benzene, 1,4-bis[α-(4-amino-3,5-dimethylphenyl)-α-methylethyl]benzene, bis(4-amino-3-methylphenyl)sulfone, 1,1'-biphenyl-3,3'-dimethyl-4,4'-diamine, 1,1'-biphenyl-3,3'-dimethoxy-4,4'-diamine, 4,7,10-trioxatridecane-1,13-diamine, and diaminonaphthalenes.

Preferred curing agent include, for example, aliphatic nitrogen-containing compounds, including poly(ether) amines, guanidines (for example, dicyandiamide and tetramethyl guanidine), imidazoles (for example, 2-ethyl-4-methyl imidazole), cyclohexylamine, diethylenetriamine, triethylenetetraamine, cyclohexyldiamine, tetramethylpiperamine, N,N-dibutyl-1,3-propane diamine, N,N-diethyl-1,3-propane diamine, 1,2-diamino-2-methyl-propane, 2,3-diamino-2-methylbutane, 2,3-diamino-2-methylpentane, and 2,4-diamino-2,6-dimethyloctane.

Examples of suitable phenolic curing agents include polyhydric phenols, for example, pyrocatechol, resorcinol, hydroquinone, 4,4'-dihydroxydiphenyl methane, 4,4'-dihydroxydiphenyl dimethylmethane, 4,4'-dihydroxy-3,3'-dimethyldiphenyl methane, 4,4'-dihydroxydiphenyl methylmethane, 4,4'-dihydroxydiphenyl cyclohexane, 4,4'-dihydroxy-3,3'-dimethyldiphenyl dimethylmethane, 4,4'-dihydroxydiphenyl sulfone, and tris-(4-hydroxyphenyl)methane; and 9,9-bis(4-hydroxyphenyl) fluorene and ortho-substituted analogs thereof.

Other useful curing agents include chloro-, bromo-, and fluoro-containing Lewis acids of aluminum, boron, antimony, and titanium, such as aluminum trichloride, aluminum tribromide, boron trifluoride, antimony pentafluoride, titanium tetrafluoride, and the like. It is also desirable at times that these Lewis acids be blocked to increase the latency of adhesive compositions containing them. Representative of blocked Lewis acids are $BF_3$-monoethylamine, and the adducts of $SbF_5X$, in which X is a halogen, —OH, or —$OR^1$ in which $R^1$ is the residue of an aliphatic or aromatic alcohol, aniline, or a derivative thereof, as described in U.S. Pat. No. 4,503,211.

Suitable photolytically activated curing agents include, for example, iodonium and sulfonium salts of antimony and cobalt, and bis(arene) iron compounds.

Examples of commercially available curing agents suitable for use in the epoxidess include EPI-CURE 8535-W-50 and EPI-CURE 8537-WY-60 (available from Shell Chemical Company, Houston, Tex.), HY 955 (available from Ciba Specialty Chemicals Corporation), AMICURE CG-1400, ANCAMINE 2337S, CUREZOL 2E4MZ, and CUREZOL PHZ-S (available from Air Products, Pacific Anchor Chemical, Allentown, Pa.), and DCA-221 (available from Dixie Chemical Company, Pasadena, Tex.).

The curing agent is preferably present in an amount of about 2 to about 110 parts by weight, per 100 parts by weight of the epoxide resin. When the curing agent is a carboxylic acid, a guanidine, a phenol, an anhydride, or a primary or secondary amine, the curing agent preferably is present in about 0.5 to about 1.7 equivalents of acid, anhydride, or amine per equivalent of epoxide group. When the curing agent is an anhydride or a phenol, accelerators may be added in amounts of about 0.1 to about 5.0 percent based on the weight of epoxide resin. Accelerators may also be used alone and in the amounts noted. Examples of suitable accelerators include aromatic tertiary amines such as benzyldimethyl amine, and imidazoles such as 2-ethyl-4-methylimidazole. Lewis acids are preferably used in amounts of between about 0.1 and about 5 percent by weight based on the total weight of the epoxide resin.

Epoxy, Acrylate, Cyano-Acrylate, and Urethane Adhesives

Useful epoxy resin adhesives include 3M™ Scotch-Weld™ epoxy resin adhesives available from Minnesota Mining and Manufacturing Company, for example, having product names DP-100; DP-105; DP-110; DP-125; DP-190; DP-270; DP-420; DP-460; 1751; 1833; 1838; 2158; 2210; 2216; and 3501.

Other useful epoxy resin compositions are those that contain glycidyl ethers of hydroxy-phenylfluorene and/or an aminophenyl fluorene curing agent. These and other useful epoxy resin compositions that may be used as a curable adhesive are generally described in U.S. Pat. Nos. 4,684,678; 4,707,534; 4,777,084; 5,276,106; 5,369,192; 5,728,755; and 6,054,221.

Commercially available examples of curable crosslinking acrylate adhesives include 3M™ Scotch-Weld™ DP-8005 and the Pronto™ Instant Adhesives line of cyano-acrylate adhesives (available from Minnesota Mining and Manufacturing Company).

Useful urethane adhesives are those that cure by exposure to moisture and crosslink. Such commercially available curable urethane adhesives include those having the product names of 3M™ Scotch-Weld™ DP-605NS; 3532; 3535; and 3549 (available from Minnesota Mining and Manufacturing Company).

Optional Adhesive Additives

The curable adhesive compositions used in the protective articles of the present invention can include conventional additives such as tackifiers, plasticizers, flow modifiers, neutralizing agents, stabilizers, antioxidants, fillers, colorants, and the like, as long as they do not interfere with the fluid resistance of the adhesive. The curable adhesive compositions may also contain anti-corrosion additives or materials. Such additives can be used in various combinations. If used, they are incorporated in amounts that do not materially adversely affect the desired properties of the cured adhesives. Typically, these additives can be incorporated into these systems in amounts of about 0.05 weight percent to about 25 weight percent, based on the total weight of the epoxide composition.

Optionally, the protective articles of the invention may have a topcoat. The topcoat can be placed on top of the fluoropolymer film of the protective article to increase protection and/or change the appearance of the protective article. For example, a topcoat of a fluoroelastomer may be applied to impart additional thermal and rain resistance to the protective article. An example of such a fluoroelastomer is a modified CAAPCOAT Type III or TYPE IV fluoroelastomer available from the CAAP Company suitable for roll coating in the appropriate colors and with appropriate additives.

Another example of a top coat is a cured urethane topcoat. Cured urethane topcoats can be made from the reaction products of a hydroxy-containing material (base material) and isocyanate-containing material (activator) for example, polyisocyanate. Such curable compositions having the hydroxy- and isocyanate-containing materials may also further comprise a colorant. The curable compositions usually contain solvents and may also further contain other additives such as UV stabilizers, antioxidants, corrosion inhibitors, curing catalysts, and the like.

Useful stoichiometric ratios, based on equivalent weights, of isocyanate: hydroxyl functionality are from 2.1:1 to 0.5:1, preferably from 2.1:1 to 1:1, and more preferably from 2.1:1 to 1.4:1.

Protective articles of the present invention can be prepared using standard film-forming and adhesive-coating techniques. Typically, a fluoropolymer is extruded onto a carrier, such as polyethylene terephthalate film, which can be smooth or rough for glossy or matte finish backings, to form a backing. The backing is then allowed to cool and solidify. The exposed surface of the backing is then optionally treated.

A layer of curable adhesive is then applied to the surface of the backing. The entire surface of the fluorinated polymer backing may be completely or partially covered with a curable adhesive. The thickness of the curable adhesive is not limited and an optimum thickness would likely depend upon the type and surface geometry or finish of the substrate to be bonded. Good substrate adhesion has been demonstrated using a very thin curable adhesive thickness, for example, about 0.0025 cm. However, thinner curable adhesives layers could be used if the desired level of adhesion is obtained on the selected substrate. A wide variety of coating techniques can be used, such as knife coating, roll coating, etc. The curable adhesive can also be applied using solvent cast techniques, for example. Alternatively, a layer of curable adhesive could be laminated to the backing. If desired, a release liner can be applied over the adhesive layer. If desired, the carrier for the backing may be removed, the exposed surface of the backing may be treated as described above for enhanced adhesion to another adhesive, for example, a pressure sensitive adhesive.

In the case of uncured composite articles comprising matrix binder resins (typically but not limited to thermosetting matrix binder resins) and fibers, a fluorinated polymer film may be shaped and then co-cured with the uncured composite article to form a finished composite article having a fluorinated polymer film coating. Alternatively, a thin layer of adhesive is applied to the fluoropolymer film as described above and the protective article is placed over the uncured composite article and then co-cured with the uncured composite article to form a finished composite article having a fluoropolymer film coating. In another alternative, a fluoropolymer film having a pressure sensitive adhesive on one surface (for example, as described in WO 99/64235) may be placed onto the uncured composite article and then co-cured with the uncured composite article to form a finished composite article having a fluoropolymer film coating. In the co-curing of uncured composite articles and the fluoropolymer films described above, hand pressure is used to bring the fluoropolymer films in contact with the uncured composite articles followed by debulking (as described in Engineered Materials Handbook Volume 1 Composites) to remove any entrapped air. In another alternative, a protective article of the invention may be placed onto a cured composite article and the curable adhesive of the protective article is cured. In these ways, the protective articles of the invention can be used to provide protective coatings on composite articles and finish and/or color matched coatings if desired.

In the practice of this invention, a protective article of the invention may be used in the initial production of a protected substrate, for example, a composite article, or used in the field on substrates in which case the curable adhesive may be cured at ambient temperature or may require elevated temperature. The required elevated temperature may be provided by known means such as IR lamps, heat guns, portable heaters, and the like.

In general, the protective articles of the invention can be used on any substrate to which the curable adhesive will bond thereto. Examples of such substrates include painted surfaces, primed surfaces, metallic surfaces, ceramics, cured and un-cured composite surfaces, fluorinated polymer surfaces, plated surfaces, galvanized surfaces, other appliqués, and the like.

The outer exposed surface of the protective article construction of the present invention may be provided with a patterned structure. Such patterned structures are useful for reducing fluid (for example, air, water) drag resistance over and/or across the exposed surface. Such patterned structures and means of providing them are taught in U.S. Pat. Nos. 5,133,516 and 5,848,769.

The invention will be more fully appreciated with reference to the following non-limiting examples. All dimensions given in the test methods and the examples are nominal dimensions.

EXAMPLES

Test Methods

Peel Adhesion Strength

Coupons having samples of the protective articles of the invention thereon were evaluated for peel adhesion strength at 24° C. Specifically, coupons were prepared as described below and were tested according to PSTC-1 (11/75) and further described in U.S. Pat. No. 5,670,557. After the specified dwell conditions, the tape reinforced portion end of each sample was lifted to expose the taped longitudinal edge of the coupon. The taped longitudinal edge of the coupon was then clamped in the jaws of a tensile testing machine (Instron Universal Testing Instrument Model #4201 equipped with a 1 kN Static Load Cell, available from Instron Company Corporation, Canton, Mass.). The tape reinforced portion of the sample was attached to the load cell and peeled at an angle of 180° and at a rate of 30.5 cm/minute. The peel adhesion force required to remove the sample from the test substrate was recorded in ounces and the average value between 5.1 and 7.6 cm of jaw distance traveled was taken. The average value in ounces/inch was determined and normalized to Newtons/100 mm.

Gloss Match

Samples of the invention were visually inspected for gloss match to the underlying fluoropolymer covered substrate to which they were applied. Samples having a gloss similar to that of the substrate were assigned a grade of "Pass" and those having a gloss noticeably different from the substrate were assigned a grade of "Fail".

Color Match

Samples of the invention were visually inspected for color match to the underlying fluoropolymer covered substrate to which they were applied. Samples having a color similar to that of the substrate were assigned a grade of "Pass" and those having a color noticeably different from the substrate were assigned a grade of "Fail".

Fluid Resistance

Test coupons were immersed in SKYDROL Hydraulic Fluid for 30 days at 23° C., then removed from the fluid and visually inspected for swelling, edge lift, loss of adhesion, and color loss. Any notable change to the sample resulted in an assigned grade of "Fail". If no visual change occurred as a result of immersion, a grade of "Pass" was assigned.

Gouge Hardness

A 7.6 cm×11.4 cm×0.063 cm aluminum substrate (Product #2024-T3, available from Q-Panel Lab Products, Cleveland, Ohio) was washed three times with isopropyl alcohol prior to use. A sample of protective article, having the release liner from the PSA layer and the polyester carrier web removed, and having dimensions about 2.54 cm greater than that of the aluminum substrate, was applied by hand to the cleaned substrate. The protective article was rubbed down by hand and the edges trimmed of excess material to give a test coupon. The protective article-covered coupon was conditioned at 70° F. (21° C.) and 50 percent Relative Humidity for at least 72 hours prior to testing. Gouge hardness of the exposed film backing of the protective article was measured using ASTM D3363-92a. Hardness was reported for the hardest pencil that left the film uncut for a stroke length of at least 3 mm. A grade of "Fail" was reported for those specimens that did not meet the requirements of the softest pencil hardness (Kimberly 525 6B, General Pencil Company, USA). That is, a grade of "Fail" indicates the film was too soft to give a hardness rating according to this test.

Pencil Hardness Table (Kimberly 525, General Pencil Company, USA)

| 6B | 5B | 4B | 3B | 2B | B | HB | F | H | 2H | 3H | 4H | 5H | 6H |
|----|----|----|----|----|---|----|---|---|----|----|----|----|----|
| Softer | | | | | | | | | | | | | Harder |

Impact Resistance

Impact resistance was evaluated using the apparatus and procedure described in ASTM D 2794-93 with the following modifications. One intrusion impact and one extrusion impact were run on a test sample using an impact value of 80 inch-pounds (40 inch height, 2 pound weight). The punch diameter was 0.625 inches (15.9 mm). The test sample was then visually inspected for cracks in the film and for lifting of the adhered article. A grade of "Pass" was assigned if no cracking or lifting was observed; a grade of "Fail" was assigned if cracking or lifting was detected.

General Film Backing Preparation

A clear fluoropolymer film backing was prepared by feeding pellets of clear DYNEON THV 500 into an extruder. The pellets were extruded into a film onto a 51 μm thick polyester carrier web using a Haake extruder having a screw diameter of 1.9 cm and a die width of 20.3 cm, and employing a screw speed of 165 rpm and a web speed of 1.8 meters/minute. The extruder die was held approximately 1.9 cm away from the carrier. The extruder had three zones that were set as follows: 224° C. in zone 1; 243° C. in zone 2; and 246° C. in zone 3. The die temperature was set at 246° C. The resulting extruded clear film had a thickness of 88.9 μm±12 μm.

General Preparation of Protective Article

A protective article having a curable epoxy adhesive resin thereon was provided in the following manner. Film samples measuring approximately 2.54 cm×11.4 cm were cut from the clear fluoropolymer film prepared as described in "General Film Backing Preparation". An area of approximately 2.54 cm×7.0 cm on one surface of each sample was then coated with 3M™ Scotch-Weld™ DP-190 Adhesive Gray curable epoxy adhesive ((chloromethylethyl)oxirane—4,4'-(1-methylethylidene)bisphenol copolymer epoxide resin and an aliphatic polymer diamine curing agent in a dualpack, available from Minnesota Mining and Manufacturing Company, St. Paul, Minn.) using a knife-over-bed coating station having a gap setting between knife and bed of 50.8 μm greater than the combined thickness of the fluoropolymer film backing and the carrier web employed.

General Preparation of Test Substrate

A gray colored fluorinated polymer backing having an acrylic pressure sensitive adhesive (PSA) on one side ("Pressure Sensitive Appliqué")was provided and evaluated in the following manner. A gray fluoropolymer film backing was prepared by feeding a uniform mixture of pellets having 90 percent (w/w) clear DYNEON THV 500 and 10 percent (w/w) of gray pigmented DYNEON THV 200 (this pigmented material was prepared by Americhem, Incorporated, Elgin, Ill., such that the color of the resultant gray backing met the specifications for Federal Standard 595B, Color #36375) into an extruder. The pellets were extruded onto a polyester carrier web as described in "General Film Backing Preparation" above. The resulting film backing was then treated by Acton Technologies, Inc., Pittston, Pa., using their FLUORO-ETCH process.

Next, an acrylic polymer solution was prepared. More specifically, the following components were added to a one liter, narrow-mouthed bottle: 70 parts by weight isooctyl acrylate (IOA), 56 parts by weight ethyl acrylate, 14 parts by weight acrylic acid (AA), 260 grams ethyl acetate, and 0.42 grams benzoyl peroxide thermal initiator. This monomer solution was purged with nitrogen at a rate of 1 liter/minute for two minutes. The bottle was sealed and placed in a rotating water bath at 59° C. for 24 hours. The resulting polymer solution was diluted with heptane to give a 21 percent solids solution. Next, 2.1 parts of a 5 percent (w/w) solution of N,N'-bis-1,2-propyleneisophthalamide in toluene was added, and the final polymer solution was then poured onto the treated surface of the gray fluoropolymer film backing, and coated using a knife-over-bed coating station. The gap between knife and bed was set to be 203 μm greater than the combined thickness of the fluoropolymer film backing and the polyester carrier web. The coated backing was dried in a 12-meter convection oven having three zones set as follows: zone 1: 41° C., zone 2: 60° C., and zone 3: 82° C. The coated backing was passed through both the coating station and the drying oven at 1.52 meters/minute. After drying, the combined thickness of the film backing and cured adhesive was approximately 132 μm, indicating an adhesive thickness of about 43 μm. A gray colored Pressure Sensitive Appliqué was obtained. Next, a 127 μm thick polyethylene release liner was laminated onto the exposed side of the pressure sensitive adhesive.

A 7.6 cm×11.4 cm×0.063 cm aluminum substrate (Product 2024-T3, available from Q-Panel Lab Products) was washed three times with isopropyl alcohol prior to use. After removal of the polyethylene release liner and polyester carrier web, a sample of gray colored Pressure Sensitive Appliqué having dimensions about 2.54 cm greater than that of the aluminum substrate was applied and rubbed down by hand to the cleaned aluminum substrate. The excess Pressure Sensitive Appliqué was trimmed from the edges of the substrate. A piece of 3M Scotch Brand 898 High Performance Tape (available from Minnesota Mining and Manufacturing Company, St. Paul, Minn.), measuring 2.54 cm×11.4 cm, was wrapped around one longitudinal edge of the substrate such that each opposing surface of the substrate was covered with about 1.2 cm of the tape. An aluminum test substrate covered on one side with a gray colored Pressure Sensitive Appliqué was thus obtained.

Immediately after their preparation two samples of the protective article, prepared as described in "General Preparation of Protective Article", were applied with light finger pressure across the width (7.6 cm) of the Pressure Sensitive Appliqué covered test substrate such that the epoxy adhesive resin coated portion of each article was in direct contact with the exposed untreated surface of the Pressure Sensitive Appliqué. The polyester carrier web was then removed from each article and the samples were cured at ambient conditions (22° C.; 50 percent Relative Humidity) for 24 hours. Next, 3M Scotch Brand 898 High Performance Tape (available from Minnesota Mining and Manufacturing Company, St. Paul, Minn.) having dimensions equal to that part of the protective article which encompassed the 1.2 cm width of the taped longitudinal edge of the Pressure Sensitive Appliqué covered aluminum substrate and the approximately 5.0 cm section of the article overhanging the edge of the coupon was applied to that part of the article to prevent stretching of this portion of the sample during testing.

Example 1

A clear fluoropolymer film backing was provided and used to prepare a protective article having a curable epoxy adhesive resin as described in "General Film Backing Preparation" and "General Preparation of Protective Article" above. The peel adhesion strength of the resulting protective article was evaluated as described in "Peel Adhesion Strength" above and the results are reported in Table 1 below.

Example 2

Example 1 was repeated with the following modification. The surface of the film backing to be coated with the curable epoxy adhesive resin was treated by Acton Technologies, Inc., Pittston, Pa., using their FLUOROETCH process prior to coating of the epoxy resin. The peel adhesion strength was evaluated according to the method described above and the results are reported in Table 1 below.

Example 3

Example 1 was repeated with the following modification. The surface of the film backing to be coated with the curable epoxy adhesive resin was treated with a corona discharge of 17 J/cm$^2$ at a rate of 0.6 meters/minute using a gas mixture of 1 percent (by volume) hydrogen in nitrogen on a bare roll treater with rotating type electrodes covered with a silicone dielectric. The peel adhesion strength was evaluated according to the method described above and the results are reported in Table 1 below.

Example 4 (Comparative)

Three 2.54 cm×11.4 cm samples of the gray colored Pressure Sensitive Appliqué described in "General Preparation of Test Substrate" were provided and the release liner was removed. The samples were applied across the width (7.6 cm) of a Pressure Sensitive Appliqué covered aluminum substrate prepared as described in "General Preparation of Test Substrate" above. The polyester carrier web was then removed from each sample and the resulting test coupon was exposed to ambient conditions for 24 hours. Next, 3M Scotch Brand 898 High Performance Tape was applied to the three samples in the manner described in "General Preparation of Test Substrate" above. The peel adhesion strength was evaluated according to the method described above and the results are reported in Table 1 below.

TABLE 1

| Example | Peel Adhesion Strength (N/100 mm) |
| --- | --- |
| 1 | 98.1 |
| 2 | 98.1 |
| 3 | 99.9 |
| 4 (Comparative) | 2 |

Example 5

A protective article having a gray fluoropolymer film backing was prepared as described in Example 2 with the following modifications. A gray fluoropolymer film backing, prepared as described in "General Preparation of Test Substrate" was employed. The test substrate was 7.6×15 cm panel painted with a polyurethane paint designated as 1-COAT, TT-P-2756, 36320 (available from Deft, Inc., Irvine Calif.). The 3M™ Scotch-Weld™ DP-190 Adhesive Gray curable epoxy adhesive was applied to the test substrate using the applicator gun and mixing nozzle provided with the adhesive resin. A 0.3 cm bead of the epoxy was applied across the width of the test substrate in a zigzag pattern such that the resulting width of the pattern was 1.9 cm. A 2.54 cm wide by 11.4 cm long sample of the gray fluorinated polymer backing was then placed over the zigzag pattern of the uncured epoxy resin. A plastic squeegee was then used to evenly spread the uncured resin between the fluorinated polymer backing and the test substrate such that the resulting layer of epoxy resin was approximately 50.8 µm thick, free of entrapped air, and substantially covered entire fluorinated polymer backing.

Example 6 (Comparative)

A 0.5 cm bead of 3M™ Scotch-Weld™ DP-190 Adhesive Gray curable epoxy adhesive was applied in a straight line across the width of the painted substrate containing Example 5 with an applicator and nozzle as described above.

Example 7

Example 5 was repeated with the following modifications. A 66 percent solids (by weight) mixture of 3M™ Scotch-Weld™ DP-190 Adhesive Gray curable epoxy adhesive in isopropyl alcohol (IPA) was provided. The resulting mixture was applied to a 2.54 cm wide by 11.4 cm long sample of the gray fluorinated polymer backing using a piece of cheesecloth dipped into the mixture and wiping the backing by hand. The IPA was then allowed to evaporate at room temperature for approximately 10 minutes and the resulting dried curable adhesive resin was determined to have a thickness of approximately 2.54 µm. The resulting protective article was applied to the painted substrate containing Example 5 and Example 6 (Comparative).

The uncured Examples 5, 6 (Comparative), and 7 on the painted substrate were allowed to cure at room temperature for 72 hours. The resulting test coupon with the three cured samples was soaked in SKYDROL for 31 days after which peel adhesion strength (Examples 5 and 7 only) and fluid resistance were determined according to the methods described above. The results are reported in Table 2 below.

Example 8

Example 5 was repeated with the following modification. The test substrate employed was an aluminum substrate (Product 2024-T3, available from Q-Panel Lab Products, Cleveland, Ohio).

Example 9 (Comparative)

Example 6 was repeated with the following modification. The substrate employed was the test coupon having Example 8 thereon.

The uncured Examples 8 and 9 (Comparative) on the aluminum substrate were allowed to cure at room temperature for 72 hours. The resulting test coupon with the two cured samples was soaked in SKYDROL for 31 days after which peel adhesion strength (Example 8 only) and fluid resistance were determined according to the methods described above. The results are reported in Table 2

TABLE 2

| Example | Fluid Resistance | Peel Adhesion Strength (N/100 mm) |
| --- | --- | --- |
| 5 | Pass | 119 |
| 6 (Comparative) | Fail | * |
| 7 | Pass | 110 |
| 8 | Pass | 116 |
| 9 (Comparative) | Fail | * |

* The adhesive sample was a bead and was not capable of being measured for peel strength.

Example 10

A clear fluorinated polymer backing was prepared as described in "General Film Backing Preparation" above. Next, the top surface of the backing was treated by Acton Technologies, Inc. (Pittston, Pa.) using their FLUOROETCH process. The etched side of the clear fluorinated polymer backing was coated with a urethane paint composition (white Desothane HS CA 8000 BMS-10K Type II, Class B, Grade D, available from PRC-DeSoto International, Inc., a PPG Industries Company, Indianapolis, Ind.) using a knife-over-bed coater having a gap setting of 50.8 μm greater than the combined thickness of the fluorinated polymer backing and polyester carrier. The urethane paint composition was allowed to cure at room temperature for 24 hours. A cured composite comprising the urethane coated film described above was prepared in the following manner. Two plies of 3M™ Scotchply™ Epoxy Prepreg SP-381 glass fabric prepreg (an epoxy resin based prepreg material commercially available from Minnesota Mining and Manufacturing Company, St. Paul, Minn.), each ply measuring 15.2 cm×15.2 cm, were placed one on top of another. This two-ply lay-up was put on a vacuum table, covered with a release liner, and a vacuum of 71 cm Hg was applied for 5 minutes to remove air entrapped between the two plies and consolidate them. Two such consolidated two-ply lay-ups were then placed one on another and consolidated as described above to give a four-ply lay-up. Finally, two such four-ply lay-ups were placed one on another and consolidated to give an eight-ply lay-up. The urethane coated fluoropolymer film was then placed on the eight-ply lay-up with the treated, exposed fluoropolymer side in contact with the glass fabric prepreg.

The resulting uncured article was put on the center of a metal plate which measured 20 cm by 20 cm by 0.3 cm and had been wrapped with 0.01 cm thick TEFLON release film (commercially available from DeWal Industries, Inc., Saunderstown, R.I.). Two 25 cm long glass fiber bleeder strings were then placed between the 3M™ Scotchply™ Epoxy Prepreg SP-381 glass fabric prepreg and the TEFLON wrapped metal plate, each one 2.5 cm from opposite outer edges. The bleeder strings extended beyond the article edge by 5 cm on both ends. An adhesive-backed cork dam, 0.64 cm wide and 0.32 cm thick, was placed around the uncured article and adhered to the bottom plate so that the bleeder strings extended over the cork ribbon.

A second TEFLON wrapped metal plate measuring 15.2 cm×15.2 cm×0.16 cm was then placed on top of the article and rested inside the border created by the cork dam. The edges of the top metal plate were sealed with 50.8 mm wide 3M SCOTCHMARK Polyester Composite Bonding Tape (available from Minnesota Mining and Manufacturing Company, St. Paul, Minn.) having a thickness of 0.005 cm. The entire assembly was placed onto an autoclave tool, covered with a vacuum bag, and cured in an autoclave. A vacuum of 76 cm Hg was applied for 15 minutes at 25° C., and then a pressure of 0.59 MPa was applied. The vacuum was released when the pressure reached 0.28 MPa. Upon reaching the final pressure, the temperature was raised to 121.1° C. at a rate of 2° C./minute. The assembly was cured at this temperature for two hours, after which the autoclave was internally cooled with a mixture of steam and cold tap water to 25° C. at a rate of 5° C./minute. The cured article exhibited excellent adhesion at the fluoropolymer/fiber reinforced composite interface. The urethane coated fluoropolymer film could not be removed or peeled from the surface of the composite without destroying the coated film.

Example 11

Example 10 was repeated with the following modification. A white pigmented fluoropolymer film backing was used in place of the urethane paint coated clear fluoropolymer film. The white pigmented fluorinated polymer backing was prepared by extruding a uniform mixture of 90 percent (w/w) clear DYNEON THV 500 charged with 10 percent (w/w) of a blend of white pigment in DYNEON THV 200 such that the color of the resultant white backing met the specifications for Federal Standard 595B, Color #17925.

The cured article exhibited excellent adhesion at the fluoropolymer/fiber reinforced composite interface. The white pigmented fluoropolymer film could not be removed or peeled from the surface of the composite without destroying the fluoropolymer film.

Example 12

Example 11 was repeated with the following modifications. An acrylic PSA coating was prepared and applied, as described in "General Preparation of Test Substrate", to the etched side of the white pigmented fluoropolymer film. The cured article exhibited excellent adhesion at the fluoropolymer/PSA/fiber reinforced composite interfaces. The white pigmented fluoropolymer film could not be removed or peeled from the surface of the composite without destroying the fluoropolymer film.

Example 13

Example 5 was repeated with the following modification. The test substrate employed was that described in "General Preparation of Test Substrate" with the following modification. The gray colored Pressure Sensitive Appliqué was trimmed back approximately 0.5 cm from the four edges of the underlying aluminum panel thereby exposing it. In addition, the 3M Scotch Brand 898 High Performance Tape was not applied to the test substrate.

Example 14 (Comparative)

A bead of 3M™ Scotch-WeldTm DP-190 Adhesive Gray curable epoxy adhesive was applied to the exposed aluminum surface at the edges of the test substrate described in Example 13 such that the bead partially covered the exposed surface and overlapped the gray Pressure Sensitive Appliqué surface.

The uncured Examples 13 and 14 (Comparative) on the substrate were allowed to cure at room temperature for 72 hours. The resulting test coupon with the two cured samples was soaked in SKYDROL for 31 days after which fluid resistance, and gloss and color match were determined according to the methods described above. The results are reported in Table 3 below.

TABLE 3

| Example | Fluid Resistance | Gloss Match | Color Match |
|---|---|---|---|
| 13 | Pass | Pass | Pass |
| 14 (Comparative) | Fail | Fail | Fail |

Example 15

A gray colored fluorinated polymer backing was prepared as described in Example 5. Next the treated side of the fluorinated polymer backing was coated 3M™ Scotch-Weld™ DP-190 Adhesive Gray curable epoxy adhesive. The 3M™ Scotch-WeldTm DP-190 Adhesive Gray curable epoxy adhesive was coated using a knife-over-bed coater having a gap setting of 101.6 µm greater than the combined thickness of the fluorinated polymer backing and the polyester carrier web. The 3M™ Scotch-Weld™ DP-190 Adhesive Gray curable epoxy adhesive was allowed to cure at room temperature for 72 hours. The epoxy-coated side of the fluorinated polymer backing was coated with the acrylic PSA described in "General Preparation of Test Substrates". This protective article was evaluated for gouge hardness and the results are shown in Table 4 below.

Example 16 (Comparative)

A Pressure Sensitive Appliqué was provided in the following manner. A premix acrylic syrup was prepared by combining together in a 4.0-liter glass jar 1550 grams of isooctyl acrylate (IOA), 172 grams of acrylic acid (AA), and 0.7 gram IRGACURE 651 photoinitiator. The jar was capped and a nitrogen source placed into the mixture through a hole in the cap. After purging with nitrogen for 10 minutes the mixture was gently swirled and exposed to ultraviolet (UV) irradiation using two 15 Watt blacklight bulbs (Sylvania Model F15T8/350BL) until a syrup having a visually estimated viscosity of about 1000 centipoise was obtained. The nitrogen purge and irradiation were then discontinued and 3.1 grams of hexanediol diacrylate (HDDA), 3.0 grams of 2,4-bis(trichloromethyl)-6-(3,4-dimethoxy)phenyl-s-triazine (3,4-DMT), and 3.4 grams of IRGACURE 651 were added to the premix syrup and dissolved therein by placing the combination, in a sealed jar, on a roller for 30 minutes to give the final acrylic syrup.

A gray fluorinated polymer backing was prepared by feeding a uniform mixture of pellets having 97 percent (w/w) clear DYNEON THV 500 and 3 percent (w/w) of gray pigmented DYNEON THV 200 (this pigmented material was prepared by Americhem, Incorporated, Elgin, Ill., such that the color of the resultant gray backing met the specifications for Federal Standard 595B, Color #36320) into an extruder. The uniform mixture was extruded to a thickness of 88.9 µm±12 µm onto a smooth 51 µm thick polyester carrier web using a Haake extruder having a screw diameter of 1.9 cm and a die width of 20.3 cm, and employing a screw speed of 165 rpm and a web speed of 1.8 meters/minute. The extruder die was held approximately 1.9 cm away from the carrier. The extruder had three zones which were set at 224° C. in zone 1, 243° C. in zone 2, and 246° C. in zone 3; the die temperature was set at 246° C. Next, the top surface of the backing was treated by Acton Technologies, Inc. using their FLUOROETCH process.

The final acrylic syrup was coated onto the etched surface of the fluorinated polymer backing using a knife-over-bed coating station. The knife was locked in position to maintain a fixed gap of 76.2 µm greater than the combined thickness of the fluorinated polymer backing and the carrier web employed. The syrup coated fluorinated polymer backing was then cured by passing it through a 9.1 meter long UV irradiation chamber having bulbs mounted in the top which had a spectral output from 300 nanometers to 400 nanometers, with a maximum at 351 nanometers. The temperature setpoint was 15.5° C. and the bulbs were set at an intensity of 3.1 milliWatts/centimeter$^2$. The chamber was continuously purged with nitrogen. The web speed through the coating station and irradiation chamber was 4.6 meters/minute resulting in a total measured energy dosage of 368 milliJoules/centimeter$^2$ (National Institute of Standards and Technology (NIST) units). After irradiation from the adhesive side, the final combined thickness of the cured adhesive and backing was approximately 139.7 µm, indicating a cured adhesive thickness of about 50.8 µm. A 101.6 µm polyethylene release liner was then laminated onto the exposed side of the adhesive. Next, the polyester carrier web was removed and the second, opposing surface of the backing was treated by Acton Technologies, Inc. using their FLUOROETCH process. This Pressure Sensitive Appliqué was evaluated for gouge hardness as described above and the results are shown in Table 4 below.

TABLE 4

| Example | Gouge Hardness |
|---|---|
| 15 | H |
| 16 (Comparative) | Fail |

Example 17

A white fluorinated polymer backing was prepared as described in "General Film Backing Preparation" above by extruding a uniform mixture of 90 percent (w/w) clear DYNEON THV 500 charged with 10 percent (w/w) of a blend of white pigment in DYNEON THV 200 (prepared by Americhem, Incorporated, Elgin, Ill.) such that the color of the resultant white backing blend met the specifications for Federal Standard 595B, Color #17925). The extruded film thickness was about 0.004 inches (101.6 μm). Next, the top surface of the backing was treated by Acton Technologies, Inc. (Pittson, Pa.) using their FLUOROETCH process. A coating solution was prepared by mixing 25.2 grams of "S3001 L/F CONVERTER FOR S9001" with 25.2 grams "S9001 30-Y-94™ NON-SANDING ANTI-CORROSIVE EPOXY PRIMER YELLOW BASE L/F" (both available from U.S. Paint Corporation, St. Louis, Mo.). This solution was hand coated onto the etched surface of the fluoropolymer backing by holding a smooth rod over the film backing using and then air dried at room temperature for 10 minutes to provide a final coating thickness of about 0.001 inches (25.4 μm).

The coated film was then placed over a 0.025 inch (635 μm) thick bare aluminum substrate having the approximate dimensions of 3 inches×6 inches (7.6 cm×15.2 cm) (Product #2024-T3, available from Q-Panel Lab Products, Cleveland, Ohio) and the excess film trimmed off. The aluminum substrate had been previously treated with a 1201 ALODINE etch. The coated film backing was covered with a second aluminum panel and a 2.2 pound (1.0 kg) weight was placed on top of the second panel. This assembly was cured at 150° C. for approximately 12 hours in a forced air oven. The total thickness of the panel with the fluoropolymer film backing adhered to it was approximately 0.030 inches (762 micrometers). This was visually inspected for color and finish. Impact resistance and gouge hardness were measured as described in the test methods above. The results are shown in Table 5 below.

TABLE 5

| Test Results | Example 17 |
| --- | --- |
| Color | White |
| Finish | Glossy |
| Impact Resistance | Pass |
| Gouge Hardness | ≧H |

In addition to the desirable properties shown in Table 5 above, the fluoropolymer nature of the backing provides excellent cleaning characteristics as well as UV resistance. In contrast, a protective layer such as paint is susceptible to yellowing and embrittlement upon UV exposure. Further, attempts to manually peel the fluoropolymer film from the aluminum substrate resulted in elongation and tearing of the film indicating excellent adhesion characteristics. This example demonstrates that a fluoropolymer backing having a curable anti-corrosive epoxy resin layer thereon and which can be applied to a substrate in a single step process may be provided to end-users. Upon curing the resulting article possesses a desirable combination of properties. In contrast, current approaches require the final user to employ two or more steps (e.g., application of a primer layer followed by application of the protective layer) to apply paint or a film backing to a substrate.

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. A composite article having a fluoropolymer layer comprising:
   a fiber reinforcement impregnated with a curable adhesive composition; and
   a fluorinated polymer film that is not perfluorinated in contact with the impregnated reinforcement;
   wherein the fluorinated polymer film has a pressure sensitive adhesive layer on at least one surface of the film.

2. The composite article of claim 1 wherein the fluorinated polymer film has a curable adhesive layer on at least one surface of the film.

3. The composite article of claim 2 wherein the wherein the curable adhesive layer on at least one surface of the film comprises a curable thermoset adhesive layer.

4. A composite article comprising a cured composite article of claim 2.

5. The composite article of claim 1 wherein the fluorinated polymer film comprises a terpolymer of tetrafluoroethylene, hexafluorupropylene, and vinylidene fluoride.

6. The composite article of claim 1 wherein the fluorinated polymer film has at least one unetched surface.

7. A composite article comprising a cured composite article of claim 1.

* * * * *

UNITED STATES PATENT AND TRADEMARK OFFICE
CERTIFICATE OF CORRECTION

PATENT NO. : 7,608,323 B2
APPLICATION NO. : 11/553676
DATED : October 27, 2009
INVENTOR(S) : Timothy J. Clemens It is certified that error appears in the above-identified patent and that said Letters Patent is hereby corrected as shown below:

Column 2
Line 23; delete "appliqueé" and insert -- appliqué -- therefor.

Column 3
Line 13; delete "techniqués" and insert -- techniques -- therefor.

Column 5
Line 10; delete "Abmoler" and insert -- Ambler -- therefor.

Column 7
Line 52; delete "-2-methycyclohexane"
 and insert -- -2-methylcyclohexane -- therefor.

Column 8
Line 22; delete "422 1" and insert -- 4221 -- therefor.
Line 31; delete ""OXIRON2001""
 and insert -- "OXIRON 2001" -- therefor.
Line 41; delete "novolak" and insert -- novolac -- therefor.
Line 42; delete "43 1" and insert -- 431 -- therefor.
Line 42; delete "Company)" and insert -- Company). -- therefor.
Line 60; delete "curring" and insert -- curing -- therefor.

Column 9
Line 62; delete "epoxidess" and insert -- epoxides -- therefor.

Column 17
Line 27; delete "Table 2" and insert -- Table 2. -- therefor.
Line 48; delete "Pittson" and insert -- Pittston -- therefor.

Column 19
Line 18; delete "WeldTm" and insert -- Weld™ -- therefor.
Line 45; delete "WeldTm" and insert -- Weld™ -- therefor.

Column 21
Line 7-8; delete "Pittson" and insert -- Pittston -- therefor.

Column 22
Claim 3, Line 33; delete "wherein the wherein the"
    and insert -- wherein the -- therefor.
Claim 5, Line 40; delete "hexafluorupropylene
    and insert --hexafluoropropylene -- therefor.

Signed and Sealed this

Sixth Day of April, 2010

David J. Kappos
*Director of the United States Patent and Trademark Office*